UNITED STATES PATENT OFFICE.

ABEL M. HAMBLET, OF WINCHESTER, MASSACHUSETTS.

COMPOSITION FOR LEAVENING DOUGH.

1,213,357. Specification of Letters Patent. Patented Jan. 23, 1917.

No Drawing. Application filed December 10, 1914. Serial No. 876,506.

*To all whom it may concern:*

Be it known that I, ABEL M. HAMBLET, a citizen of the United States, residing at Winchester, in the county of Middlesex and State of Massachusetts, have invented new and useful Improvements in Compositions for Leavening Dough, of which the following is a specification.

My invention relates to compositions for use in leavening dough through the liberation of carbon dioxid in the mass from salts of carbonic acid; and its objects are to dispense with the use in food preparations of acid salts of aluminum, calcium, etc., of cream of tartar and other leavening agents having possible harmful hygienic effects; to utilize for leavening purposes lactic acid, which is the active acid principle of sour milk without the variations in acidity and other inconveniences incident to the use of the latter; and to produce a liquid leavening composition superior to the acid agents available in dry form, thereby rendering more positive and effective, economical and hygienic the raising of dough or batter through chemical re-actions preliminary to the completion of the cooking operation.

Prior to my invention, it was generally assumed by those skilled in the art, that convenience and practical necessity required that the acid leavening ingredients be prepared for use in dry form, and accordingly it has been the common practice to produce the required re-action by adding to the dough or batter the acid substance and the salt of carbonic acid each in dry form, either separately as in the case of cream of tartar and bicarbonate of sodium, or in a mixture as in the case of baking powder. So far as I know, the only exception to such practice, in common use, has been the use of bicarbonate of sodium with sour milk, the latter containing lactic acid in solution.

Sour milk is claimed by many authorities to be, from a hygienic standpoint, the most desirable chemical liberator of carbon dioxid at present available for use in cooking. Its active acid component, lactic acid, forms lactates with salts of carbonic acid with evolution of carbon dioxid. The sodium lactate, which results from the re-action between the lactic acid of sour milk and bicarbonate of sodium, and which remains in the food, has been found through long years of experience to have no harmful physiological effects.

In this respect, therefore, the use of sour milk is not open to possible objection on hygienic grounds, as are the products resulting from the use of the common chemical leavening agents available in dry form such as alum, acid salts of calcium, and cream of tartar. But in spite of such recognized advantage, the relative use of sour milk to that of other leavening agents has been decreasing for many years on account of certain inconveniences and disadvantages entailed by the use of the former such as the fact that sour milk is not generally available for purchase and its use necessitates the maintenance by housekeepers of a sufficient supply of sweet milk in advance to furnish the sour milk required later, and also that the variations occurring in the acidity of the milk render uniform results from the same receipt or mixture difficult to obtain, and very often result in the use of a large excess of cooking soda over that required to neutralize the acid in the milk, with consequent yellowing of the product. Furthermore, the number and variety of receipts covering the use of sour milk and soda available in cook books and other publications are not as great as for baking powder or for cream of tartar and saleratus.

I have discovered that preparation in a dry form is not necessarily essential for the convenient use of acid substances as leavening agents but that, on the contrary, certain liquid compositions containing in solution acid substances which are not readily obtainable or available in concentrated dry form may be substituted and used for the purpose with facility and advantage. Not all acid substances, other than those obtainable in concentrated dry form, are suitable, however, for use in such compositions, neither can unlimited amounts of solvent be present without detriment. Preferably, I employ for use bicarbonate of sodium, a solution of lactic acid of the chemical formula $C_3H_6O_3$ either used alone or in conjunction with either or both of its derivatives lactic anhydrid, $C_6H_{10}O_5$, and lactid, $C_6H_8O_4$.

In relation to the amount of acidity preferably required in the composition of my improved leavening agent, I have found the minimum to be not less than the equivalent of a normal acid solution. This will be clearly intelligible to the manufacturing chemist or to any one with a knowledge of chemical equivalents and volumetric analysis. If the composition is weaker in acidity than this minimum, such a volume is required to liberate the quantity of carbon dioxid necessary for proper leavening that the composition cannot be substituted for cream of tartar, or with salaratus for baking powder in cooking rules, receipts and formulæ specifying the use of the same without causing such a change in the consistency of the dough as to impair the quality of the product, or without making substantial changes in other ingredients the character and amount of which would be difficult to determine.

Lactic acid, lactic anhydrid and lactid re-act with salts of carbonic acid to form lactates with evolution of carbon dioxid. The use of the same, therefore, as leavening agents in solutions of such acidity as to permit substitution by convenient measurement, together with a proportional amount of a salt or salts of carbonic acid, for baking powder or other dry leavening substance, in cooking receipts supposed to cover only the use of the latter, would include the advantages pointed out above as possessed by sour milk without any of its disadvantages. I have found, however, marked difference in the leavening action of lactic acid solutions, either pure or as sour milk, and solutions containing lactic anhydrid or lactid, when these are mixed in dough or batter with salts of carbonic acid. Under such conditions the re-action between lactic acid and a carbonate takes place immediately, while that between lactic anhydrid or lactid and the carbonate proceeds much more slowly, particularly at ordinary room temperature, and may be completed only through rise of temperature as in cooking. A solution containing only lactic anhydrid or lactid, or a mixture of the two I have discovered would not, in the absence of lactic acid, prove a desirable substitute for baking powder when used in conjunction with a salt of carbonic acid, as the leavening action at ordinary room temperature would be too slow in the majority of cases where baking powder is used. On the other hand, a more gradual and prolonged evolution of carbon dioxid than that which takes place when ordinary baking powder is used, or sour milk or lactic acid and a carbonate, is very desirable for leavening purposes, as failure to obtain the desired result with baking powder, for instance, often is caused by the escape and loss of too large a portion of the leavening gas during the period between the time of mixing and that of baking or other cooking operation. By using in my improved composition a solution of lactic acid and either lactic anhydrid or lactid or both, I am able to produce a satisfactory leavening agent to be used in conjunction with salts of carbonic acid, which is superior to any other chemical leavening agents now on the market.

As the relative proportions of lactic acid and lactic anhydrid or lactid, or both, may be varied between considerable limits to meet special leavening conditions, I do not wish to be understood as restricting myself in any broad claims to any fixed ratio between the same. Neither do I desire, except as limited by my claims, to confine myself to any particular solvent, or to the amount of the same, provided this amount be not less than 20% of the total volume of the composition, which I consider essential to insure proper fluidity, but in illustration I will cite the following composition:—To lactic acid in aqueous solution, I add lactic anhydrid to the extent of fifteen per cent. by weight of the absolute lactic acid present in the volume of solution taken. I also add sufficient water to make the total acidity of the solution (that is, when tested by boiling with an excess of standard alkali) equivalent to the acidity of an equal volume of a solution containing twenty-five per cent. by weight of absolute lactic acid, that is, an approximately three times normal acid solution. The preparation of such a liquid composition will readily be understood by any one familiar with chemical equivalents, and volumetric analysis. I have found by repeated trials that such a composition, together with a salt of carbonic acid, may easily and with advantage be substituted as follows for any standard baking powder in cooking rules, receipts or formulæ:—An equal volume of the liquid composition to that specified of baking powder is added to the liquid called for, while one quarter of this volume of bicarbonate of sodium (saleratus) is mixed with the dry ingredients before the addition of the liquid.

In using my improved leavening agent I prefer to measure in a suitable vessel the liquid ingredients to be used in forming the mass of dough or batter, and to add to the same my liquid product of the composition above referred to. In another convenient receptacle I assemble the dry ingredients to be used and mix thoroughly therewith a quantity of bicarbonate of sodium or other salt of carbonic acid sufficient to re-act with the acid of my composition. Finally, I add the liquid ingredients to the dry and mix thoroughly, after which the mass is in proper condition for the cooking operation.

What I claim and desire to secure by Letters Patent is,—.

1. A liquid composition for use in leavening containing lactic acid and an anhydrid of lactic acid substantially equivalent in amount to not less than fifteen per cent. by weight of the lactic acid present.

2. A liquid composition for use in leavening containing lactic acid, an anhydrid of lactic acid, substantially equivalent in amount to not less than fifteen per cent. by weight of the lactic acid present and a solvent ingredient amounting to not less than twenty per cent. of the total volume of the composition.

3. A liquid composition for use in leavening containing lactic acid, an anhydrid of lactic acid substantially equivalent in amount to not less than fifteen per cent. by weight of the lactic acid present and a solvent ingredient amounting to not less than twenty per cent. of the total volume of the composition the total acidity of such composition being greater than that of a normal acid solution.

In testimony whereof I have hereunto set my hand in presence of two subscribing witnesses, this 8th day of December 1914.

ABEL M. HAMBLET.

Witnesses:
ALEXANDER BARR COMSTOCK,
ESTHER S. LINDSTROM.